US010572072B2

(12) United States Patent
Wang et al.

(10) Patent No.: US 10,572,072 B2
(45) Date of Patent: Feb. 25, 2020

(54) DEPTH-BASED TOUCH DETECTION (71) Applicant: Apple Inc., Cupertino, CA (US)

(72) Inventors: Lejing Wang, Sunnyvale, CA (US); Daniel Kurz, Sunnyvale, CA (US)

(73) Assignee: Apple Inc., Cupertino, CA (US)

(*) Notice: Subject to any disclaimer, the term of this patent is extended or adjusted under 35 U.S.C. 154(b) by 182 days.

(21) Appl. No.: 15/721,207

(22) Filed: Sep. 29, 2017

(65) Prior Publication Data
US 2019/0102044 A1 Apr. 4, 2019

(51) Int. Cl.
G06F 3/042 (2006.01)
G06K 9/00 (2006.01)
H04N 13/271 (2018.01)

(52) U.S. Cl.
CPC ....... G06F 3/0425 (2013.01); G06K 9/00087 (2013.01); H04N 13/271 (2018.05); G06F 2203/04101 (2013.01)

(58) Field of Classification Search
CPC .............. G06F 3/04847; G06F 3/0488; G06F 3/04842; G06F 3/017
See application file for complete search history.

(56) References Cited

U.S. PATENT DOCUMENTS

| | | | | |
|---|---|---|---|---|
| 2012/0326995 A1* | 12/2012 | Zhang | ................ | G06F 3/0425 345/173 |
| 2013/0107010 A1* | 5/2013 | Hoiem | .................. | G06K 9/46 348/47 |
| 2013/0342671 A1* | 12/2013 | Hummel | ............ | G06K 9/6202 348/77 |

OTHER PUBLICATIONS

Du, et al., "A Virtual Keyboard Based on True-3D Optical Ranging," BMVC 2005, doi: 10.5244/C.19.27.
C. Harrison, H. Benko, and A. D. Wilson, "Omnitouch: Wearable multitouch interaction everywhere," In Proceedings of the 24th Annual ACM Symposium on User Interface Software and Technology, UIST '11, pp. 441-450, 2011.
Wilson, Andrew D., "Using a Depth Camera as a Touch Sensor," ITS 2010: Devices & Algorithms, Nov. 7-10, 2010, Saarbrucken, Germany.

* cited by examiner

Primary Examiner — Gerald Johnson
(74) Attorney, Agent, or Firm — Blank Rome LLP (57) ABSTRACT Systems, methods, and computer readable media to improve the operation of detecting contact between a finger or other object and a surface are described. In general, techniques disclosed herein utilize a depth map to identify an object and a surface, and a classifier to determine when the object is touching the surface. Unlike the prior art, a measure of the object's "distance" is made relative to the surface and not the camera(s) thereby providing some measure of invariance with respect to camera pose. The object-surface distance measure can be used to construct an identifier or "feature vector" that, when applied to a classifier, generates an output indicative of whether the object is touching the surface. The classifier may be based on machine learning and can be trained off-line before run-time operations are commenced. In some embodiments, temporal filtering may be used to improve surface detection operations.

20 Claims, 7 Drawing Sheets

DEPTH-BASED TOUCH DETECTION

BACKGROUND

This disclosure relates generally to touch detection. More particularly, but not by way of limitation, this disclosure relates to techniques for camera-based touch detection on arbitrary surfaces.

Detecting when and where a user's finger touches a real environmental surface can enable intuitive interactions between the user, the environment, and a hardware system (e.g., a computer or gaming system). Using cameras for touch detection has many advantages over methods that rely on sensors embedded in a surface (e.g., capacitive sensor). Further, some modern digital devices like head-mounted devices (HMD) and smart phones are equipped with vision sensors—including depth cameras. Current depth-based touch detection approaches use depth cameras to provide distance measurements between the camera and the finger and between the camera and the environmental surface. One approach requires a fixed depth camera setup and cannot be applied to dynamic scenes. Another approach first identifies the finger, segments the finger, and then flood fills neighboring pixels from the center of the fingertip so that when sufficient pixels are so filled, a touch is detected. However, because this approach does not account even consider normalizing pixel depth-data, it can be quite error prone. In still another approach, finger touches are determined based on a pre-computed reference frame, an analysis of the hand's contour and the fitting of depth curves. Each of these approaches require predefined thresholds to distinguish touch and no-touch conditions. They also suffer from large hover distances (i.e., a touch may be indicated when the finger hovers 10 millimeters or less above the surface; thereby introducing a large number of false-positive touch detections).

SUMMARY

The following summary is included in order to provide a basic understanding of some aspects and features of the claimed subject matter. This summary is not an extensive overview and as such it is not intended to particularly identify key or critical elements of the claimed subject matter or to delineate the scope of the claimed subject matter. The sole purpose of this summary is to present some concepts of the claimed subject matter in a simplified form as a prelude to the more detailed description that is presented below.

In one embodiment the disclosed concepts provide a depth-based touch detection method for obtaining a depth map of a scene having a surface, the depth map comprising a plurality of pixel values (e.g., the depth map could come from a depth sensor or one or more optical cameras); identifying a first region of the depth map, the first region comprising a first plurality of pixel values indicative of an object other than the surface in the scene (e.g., the object could be a finger, a stylus or some other optically opaque object); identifying a surface region of the depth map based on the first region, the surface region comprising a second plurality of pixel values indicative of the surface (e.g., the surface could be planar or non-planar); normalizing the first region based on the surface region, wherein each normalized pixel value in the normalized first region is indicative of a distance relative to the surface (e.g., an orthogonal distance to the surface in the area of the object); generating an identifier based on the normalized first region (e.g., the identifier can be composed of the pixel values within the normalized first region); applying the identifier to a classifier (e.g., the classifier may be binary or multi-state); obtaining an output from the classifier based on the applied identifier; and performing a first affirmative operation when the classifier output is indicative of a touch between the object and the surface (e.g., such as performing the affirmative action corresponding to a "mouse click"). In some embodiments, identifying a surface region comprises identifying one or more second regions of the depth map, each of the one or more second regions having one or more pixel values, each of the one or more second regions positioned to abut or overlap at least one side of the first region; determining, based on each second region's pixel values, one or more statistical measures for each second region; and selecting, based on the statistical measures, at least one of the second regions as indicative of the surface. In other embodiments, identifying a first region can use both the depth map and another image, which itself may be either grayscale, color or infrared (IR). In still other embodiments, normalizing the first region can include resizing the first region to a specified sized having a specified number of pixel values. In yet other embodiments, normalizing the first region can also include normalizing the first region based on an orientation of the object. In one or more other embodiments, obtaining a depth map, identifying a first region, identifying a surface region, normalizing, generating, and applying may be repeated a to obtain a temporal sequence of outputs from the classifier; determining a combined classifier output based on the temporal sequence of classifier outputs; and performing the first affirmative operation when the combined classifier output is indicative of a touch between the object and the surface.

In one or more other embodiments, the various methods described herein may be embodied in computer executable program code and stored in a non-transitory storage device. In yet another embodiment, the method may be implemented in an electronic device or system having depth detection capabilities.

DETAILED DESCRIPTION

This disclosure pertains to systems, methods, and computer readable media to improve the operation of detecting contact between a finger or other object and a surface. In general, techniques are disclosed for determining when an object such as a finger touches a surface. More particularly, techniques disclosed herein utilize a depth map to identify an object and a surface, and a classifier to determine when the object is touching the surface. Unlike the prior art, a measure of the object's "distance" is made relative to the surface and not the camera(s) thereby providing some measure of invariance with respect to camera pose. The object-surface distance measure can be used to construct an identifier or "feature vector" that, when applied to a classifier, generates an output indicative of whether the object is touching the surface. The classifier may be based on machine learning and can be trained off-line before run-time operations are commenced. In some embodiments, temporal filtering may be used to improve surface detection operations.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation may be described. Further, as part of this description, some of this disclosure's drawings may be provided in the form of flowcharts. The boxes in any particular flowchart may be presented in a particular order. It should be understood however that the particular sequence of any given flowchart is used only to exemplify one embodiment. In other embodiments, any of the various elements depicted in the flowchart may be deleted, or the illustrated sequence of operations may be performed in a different order, or even concurrently. In addition, other embodiments may include additional steps not depicted as part of the flowchart. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the disclosed subject matter, and multiple references to "one embodiment" or "an embodiment" should not be understood as necessarily all referring to the same embodiment.

Embodiments of the touch detection operations set forth herein can assist with improving the functionality of computing devices or systems that accept non-keyboard input. Computer functionality can be improved by enabling such computing devices or systems to use arbitrary surfaces (e.g., a tabletop or other surface) from which to get input instead of conventional keyboards and/or pointer devices (e.g., a mouse or stylus). Computer system functionality can be further improved by eliminating the need for conventional input devices; giving a user the freedom to use the computer system in arbitrary environments.

It will be appreciated that in the development of any actual implementation (as in any software and/or hardware development project), numerous decisions must be made to achieve a developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design and implementation of computer processing systems having the benefit of this disclosure.

Figure 1:
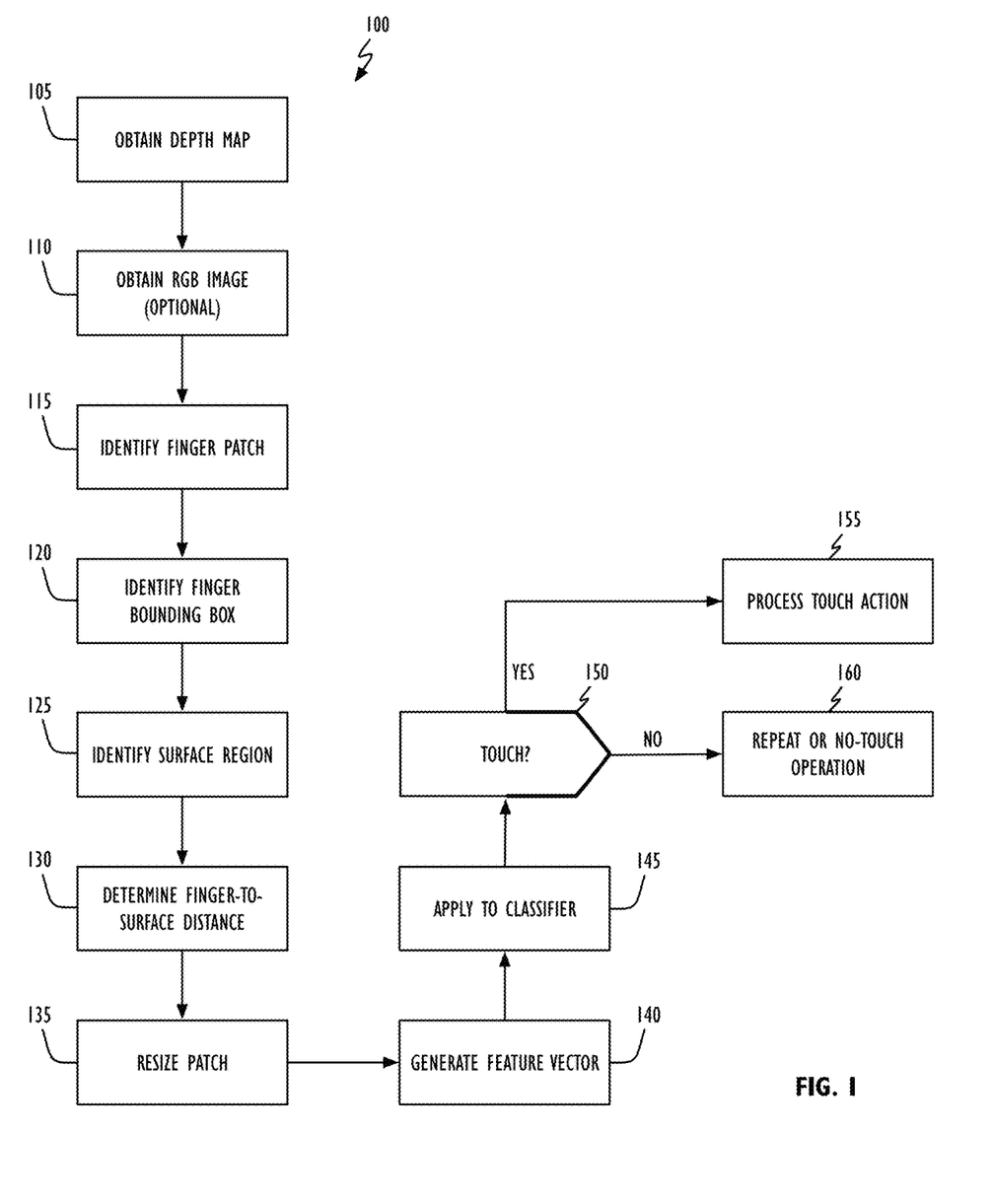
FIG. 1 shows, in flowchart form, a depth-based touch detection operation in accordance with one or more embodiments.

Referring to FIG. 1, depth-based touch detection operation 100 in accordance with one or more embodiments begins by obtaining a depth map of a three-dimensional (3D) region (block 105). Depth information may be obtained in any desired fashion. By way of example, depth information may be obtained from a depth sensor, an active structured light system, a stereo camera system, or a time of flight system. Significantly, depth-based touch detection operation 100 in accordance with this disclosure does not require that images be captured from any fixed location (that is, the camera may move with respect to the surface). As part of, or separate from, depth map capture operations in accordance with block 105 a second image may be obtained to aid in finger detection operations (block 110). This optional image may be grayscale or color (e.g., RGB, YCbCr, or IR). With the depth map and (optional) secondary image, a finger patch (block 115) and finger patch bounding box (block 120) may be identified. In practice any suitable segmentation/identification technique may be used and, while the prototypical "object" is a finger, the object whose contact with the surface is being determined could just as easily be a stylus, pen, pencil, glove, foot, shoe, or other optically opaque article. When the optional image is a color image (e.g., an RGB image), its colored pixels may be mapped to the depth image's coordinate system where after finger segmentation can proceed. In one embodiment a finger patch bounding box can be a specified fixed size regardless of the finger patch's actual size. In one example, 2 to 5 square centimeters ($cm^2$) of the surface/finger. In another embodiment, the finger patch bounding box can have a size that is proportional to the identified finger patch (e.g., 1.5 to 3 times the area of the finger patch). In still another embodiment, the finger patch bounding box may have a size that is based on the object's (e.g., finger's) size (e.g., thickness or width). By way of example, in one embodiment regions may be identified immediately adjacent to (abutting and not overlapping) each of the finger patch bounding box's sides. That region having the least variance in depth values (i.e., having the most consistent depth) may be selected as representing "the" surface. In another embodiment, the region having the smallest mean value (from all of the region's depth values) may be selected as "the" surface. The techniques disclosed herein work with surfaces of arbitrary shape such as planar surfaces, curved surfaces and spherical surfaces. In one example, a pre-defined parametric surface model (e.g., a planar or spherical surface), could be employed to estimate the surface by fitting the depth data to the model. In another embodiment, a generic surface model (e.g., based on polynomial fitting), could be used to estimate an arbitrary surface shape. In still another embodiment, the random sample consensus (RANSAC) technique may be used to estimate the surface. In some embodiments employing the RANSAC approach, surface regions need not be identified a priori. For example, a surface could be identified based on the depth information of the finger patch using RANSAC. For this, a pre-defined surface model could be used to determine surface pixels and non-surface pixels in the finger patch, wherein the non-surface pixels could be used to determine the finger pixels and eventually, the finger patch could be resized based on the size of the finger. In still other embodiments, the size of the selected region(s) does not have to be equal to the finger patch's bounding box. In yet other embodiments, the shape of the regions used to identify the surface need not be the same as the finger patch's bounding box. For that matter, the shape of the finger patch's bounding box does not need to be rectangular or square. With both the finger patch (block 120) and surface (block 125) identified, the finger patch's distance to the surface may be determined (block 130). In one embodiment, each pixel in the finger patch region may have its orthogonal distance to the surface determined. In one particular embodiment, each finger patch pixel's distance from the average surface distance (as determined in accordance with block 125) may be determined. It is to be noted that this approach, measuring an object's distance from the surface rather than from a camera, is different from all known prior art approaches. This approach places the measured distance in the surface's frame-of-reference and helps to make the disclosed approach invariant to camera position and orientation. This alone can dramatically reduce the variance of the data and improve machine learning performance. In some embodiments, the finger patch size may be resized (block 135). For example, the patch size may be resized to an 8×8, 10×10, 16×16 or 32×32. In addition, the surface distance may be normalized. For example, the surface distance could be normalized based on finger size and/or finger pose (position and orientation relative to the surface). In one implementation, the surface distance could corrected by adding finger thickness differences between the specific user's finger and an ordinary (pre-defined) finger. From the resized finger patch, a feature vector may be generated (block 140) which can then be applied to a classifier to determine with the finger (or other object) has touched the surface (block 145). For example, in the case of an 8×8 finger patch, a 64 element feature vector may be applied to the classifier. In the case of a 32×32 finger patch, a 1024 element feature vector may be applied to the classifier. In one embodiment, the classifier may be a binary classifier so as to distinguish between a touch and a no-touch condition between the object or finger and the surface. In another embodiment, the classifier may also generate an output indicative of the certainty of the identified touch/no-touch outcome. In still another embodiment, the classifier may generate an output indicative of how close the object or finger is to the surface, how much pressure is being applied to the surface (if the surface has force detection capabilities), or whether the finger is hovering above the surface. By way of example only, the classifier may be based on a random forest technique (see discussion below). Other illustrative classifier types than can be used in accordance with this disclosure include, but are not limited to, decision trees, Bayesian networks, support vector machines, neural networks and logistic regression systems. However implemented, if the applied feature vector is determined to correspond with a "touch" action or event (the "YES" prong of block 150), the touch action may be processed accordingly (block 155). In one embodiment, detection of a touch event may also result in the position of the touch event in the reference coordinate system (e.g., with reference to the surface). The touch event could be indicative of a selection operation (e.g., a mouse-click or selection action, a manipulation action (e.g., dragging), or a deselection action). If the applied feature vector is not classified as a "touch" event (the "NO" prong of block 150), actions in accordance operation 100 may be repeated or a null/no event operation may be performed (block 160). A null event could, for example, correspond to a time-out event.

Figure 2A:
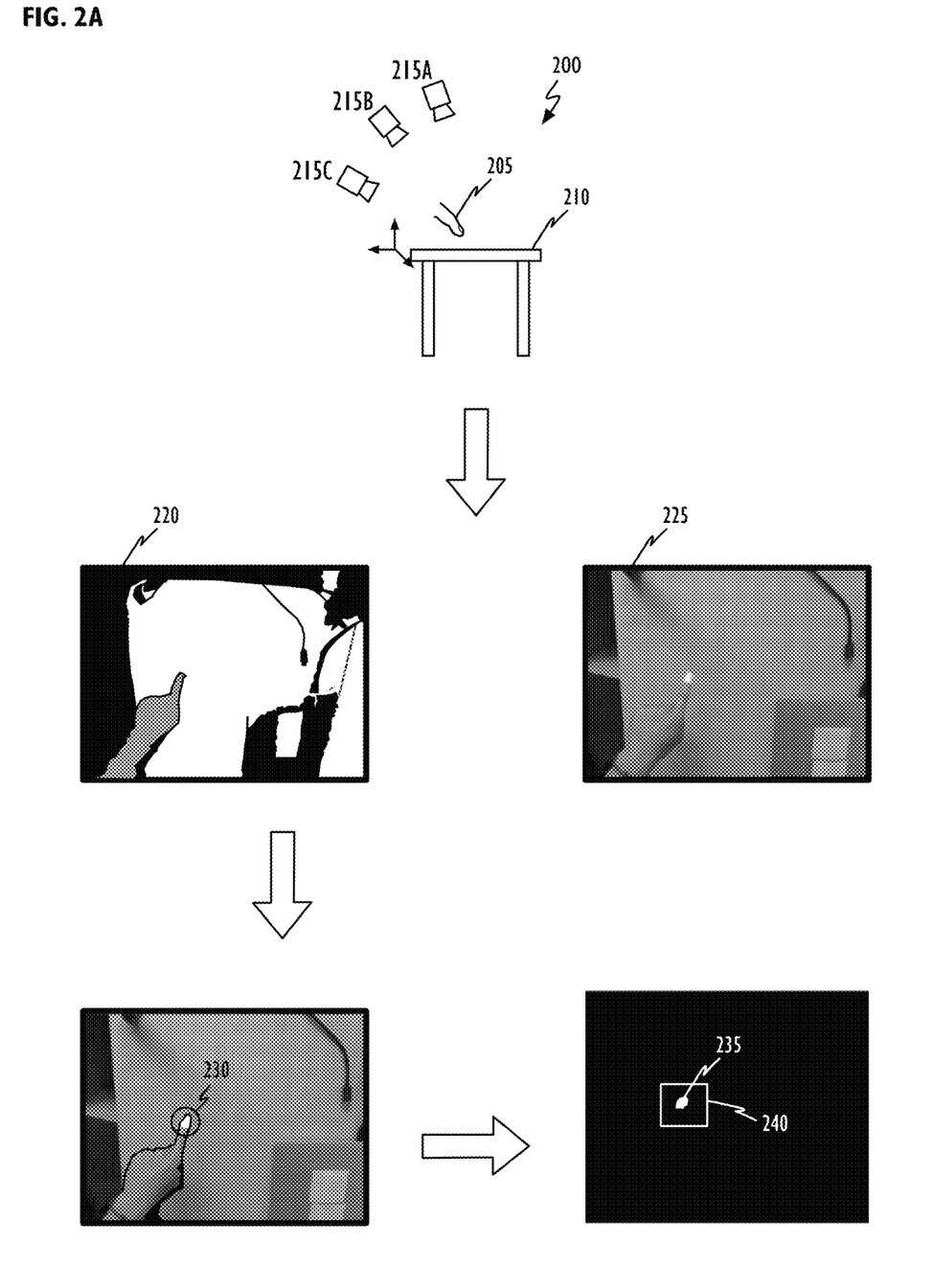
FIGS. 2A-2B illustrate various aspects of a depth-based touch detection operation in accordance with one or more embodiments.

To visualize depth-based touch detection operation 100 in accordance with one embodiment, consider FIG. 2. Referring to FIG. 2A, images of three-dimensional (3D) region 200 including object (e.g., finger 205) and surface 210 may be obtained from one or more imaging devices such as one or more head-mounted cameras that may be located at arbitrary locations as the user moves (e.g., 215A-215C). The result can be depth image 220 and, as previously noted, optional color image 225. As noted in FIG. 1, from either (or both) depth image 220 and color image 225 finger patch 230 may be identified resulting in finger mask 235 (also referred to as fingertip mask 235). A bounding box or region 240 may then be found around fingertip mask 235 as discussed above. In another embodiment, Regional Convolutional Neural Networks (R-CNNs) could be used to provide bounding boxes without a finger patch or mask. For example, bounding box 240 may have a specified fixed size, it may be sized proportional to the size of fingertip mask 235, or it could be sized based on the finger's thickness.

Figure 2B:
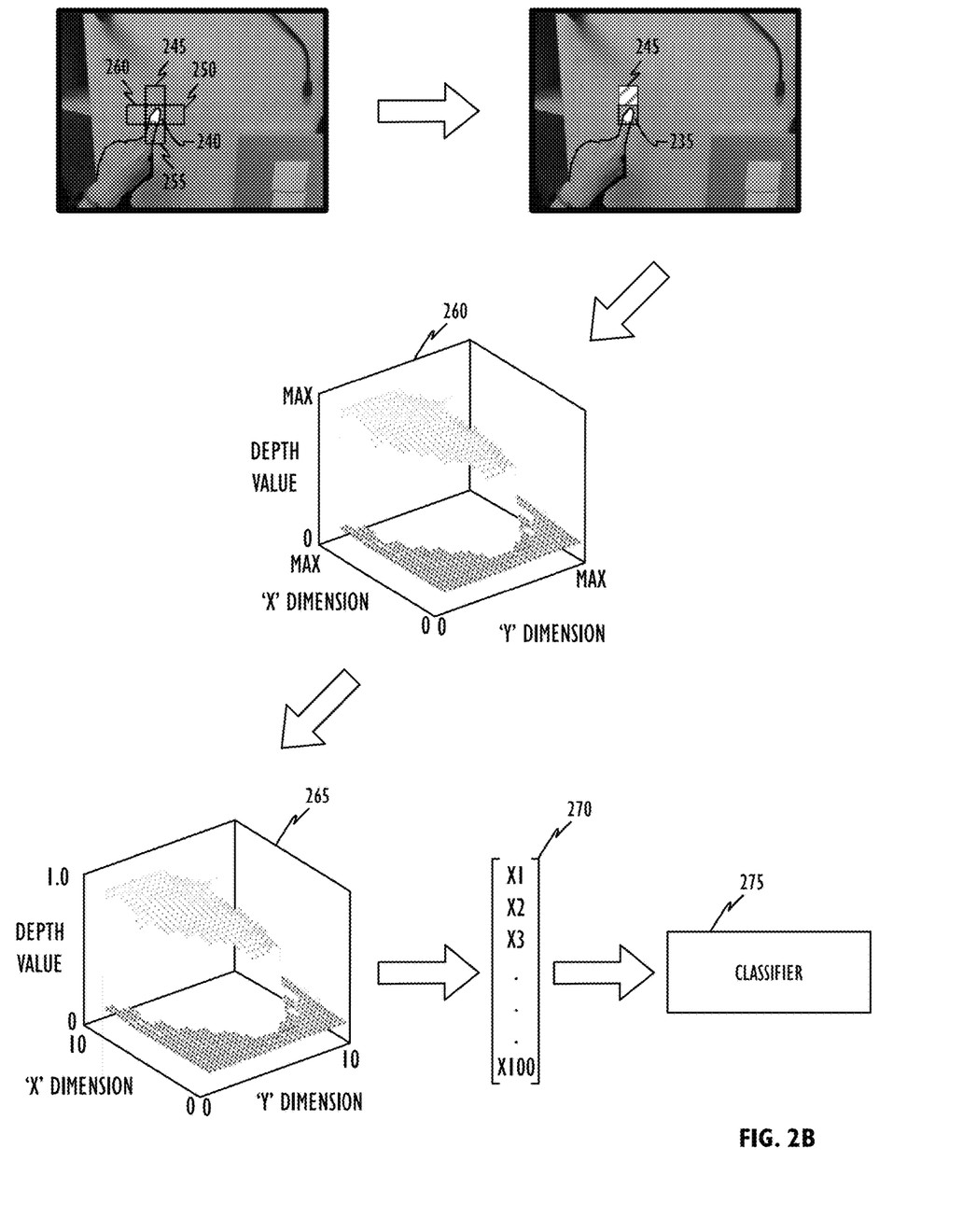

Referring to FIG. 2B, fingertip mask bounding box 240 (shown for convenience as part of color image 225) may be used to identify one or more regions that can be selected as the surface (see discussion above). By way of example, a region having the same shape and area as bounding box 240 may be placed immediately adjacent to (but not overlapping) each side of bounding box region 240; regions 245-260. Analysis of pixel values within each of these regions can be used to select the "best" region to represent the surface (again, see discussion above). For example, region 245 may be determined to be the surface and, from that a distance measure between each pixel in finger patch 235 and surface 245 may be determined as represented by element 260. Resizing fingertip patch 260 to a known size (e.g., 10×10) as discussed above can yield "normalized" fingertip patch 265. It is significant to note that each pixel's value in normalized fingertip patch 265 is indicative of the finger's (or other object's) distance to surface 245 and not to the camera (e.g., 215A-215C). As described above with respect to block 240, normalized fingertip patch 265 may be used to generate feature vector 270. In one embodiment, each pixel's value in normalized fingertip patch 265 may be concatenated to form feature vector 270. In practice, any method to generate a feature vector may be used as long the "distance" represented by each pixel is indicative of a distance between the surface and the target object (e.g., a stylus or finger). Once generated, feature vector 270 may be applied to classifier 275, the output of which is indicative of whether the object (e.g., finger 205) is touching the surface (e.g., tabletop 210). In some embodiments, detection of a touch event may also result in the position of the touch event in the reference coordinate system (e.g., with reference to the surface).

As previously noted, classifier 275 may be any of a large number of different types of classifiers. For example, classifier 275 may be a linear classifier, a support vector machine, a quadratic classifier, a kernel estimator, rules-based decision engine, decision trees, a neural network, a convolutional neural network (CNN), a deep neural network, a deep CNN, or a machine learning or statistical classifier. In one or more embodiments, classifier 275 may be implemented as a random forest; "an ensemble learning method for classification, regression and other tasks, that operate by constructing a multitude of decision trees at training time and outputting the class that is the mode of the classes (classification) or mean prediction (regression) of the individual trees. Random decision forests correct for decision trees' habit of overfitting to their training set." (Wikipedia at https://en.wikipedia.org/wiki/Random_forest, last visited on Aug. 8, 2017.) In this type of classifier, a large number of exemplar finger patches may be generated (with, for example, in-plane and out-of-plane finger or object rotation) and presented to the classifier along with a known classifier output, also called labels (e.g., "touch" or "no touch") to train the classifier. After training, the classifier may be treated as a black-box which generates an output for any given input. In other embodiments, classifier 275 may be configured to continue to learn based on post-training input (i.e., based on run-time activity). For example, semisupervised learning methods based on smoothness assumption, clustering assumption, or manifold assumption can be used to incrementally retrain and improve the classifier given new exemplars without labels. In some embodiments it has been found beneficial to train classifier 275 with a large number of fingers of different sizes and thicknesses so that it may learn these distinctions without it having to be explicitly encoded during run-time operations.

Operations in accordance with FIG. 1 have been described in terms of making a touch/no-touch decision based on a single frame (i.e., one depth map of the target object). In other embodiments temporal filtering may be used to consolidate the results from multiple frames (e.g., a temporal sequence of frames). This approach may provide more reliable results because depth data provided via current technology is inherently noisy. The use of multiple frames can also allow a system in accordance with this disclosure to estimate an object's position when it becomes occluded. In addition, temporal filtering may also be used to identify multiple classes of finger motion or finger events. Some illustrative classes include surprise (first time the object is seen); moving toward surface; touch; no-touch; moving along surface (e.g., sliding along the surface); and moving away from the surface. The temporal sliding window approach is discussed below. Other approaches could use long short-term memory (LSTM) networks (a type of recurrent neural network). That is, the classifier could be an LSTM that includes memory for previous frames.

Figure 3A:
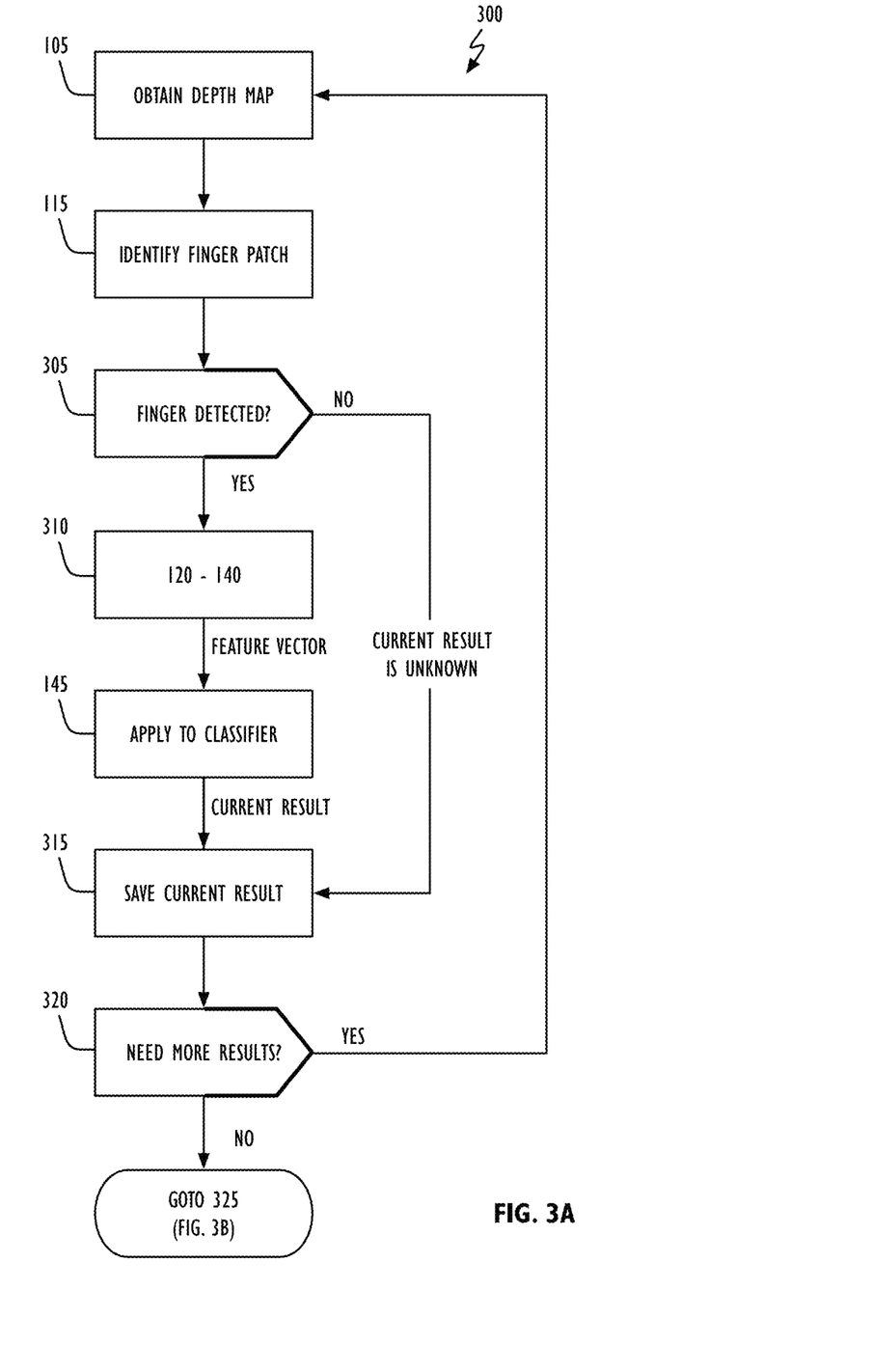
FIGS. 3A-3B shows, in flowchart form, a temporal depth-based touch detection operation in accordance with one or more embodiments.
Figure 3B:
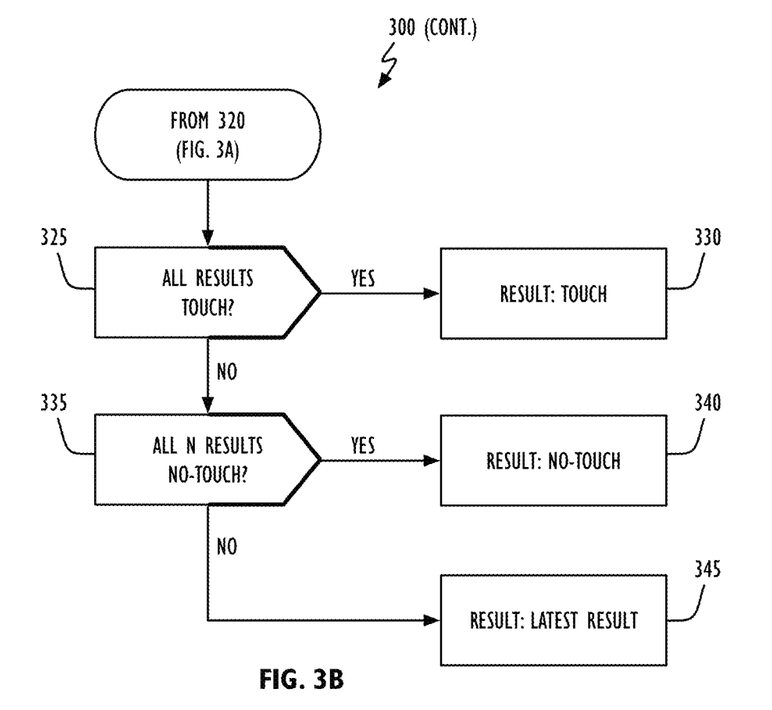

Referring to FIG. 3A, in one or more embodiments temporally filtered depth-based touch detection operation 300 begins with acquisition of a depth map of a 3D region such as that illustrated in FIG. 2A (block 105). As noted in FIG. 1, an optional second image may also be obtained of the 3D region (e.g., a color image). Finger segmentation may be performed (block 115) to determine if a finger (or other object) has been detected (block 305). If a finger is detected (the "YES" prong of block 305), operations 120-140 in accordance with FIG. 1 are performed resulting in a feature vector (block 310). The feature vector may be applied to classifier 275 to obtain a current output (block 145) that may be saved as a "current result" (block 315). A check can then be made to determine if additional frames are needed to satisfy the implemented temporal filter (block 320). If additional frames are needed (the "YES" prong of block 320), temporally filtered depth-based touch detection operation 300 continues at block 105 of FIG. 3A. If additional frames are not needed (the "NO" prong of block 320), temporally filtered depth-based touch detection operation 300 continues to FIG. 3B. Returning to block 305, if no finger (or other object) is detected (the "NO" prong of block 305), the "unknown" becomes the current result (block 315). Referring now to FIG. 3B, if all 'N' frames processed in the current temporal filter have been identified as touch events by classifier 275 (the "YES" prong of block 325), a touch result may be returned (block 330). If all 'N' frames processed in the current temporal filter have been identified as no-touch events by classifier 275 (the "YES" prong of block 335), a no-touch result may be returned (block 340). If neither a touch or no-touch result in accordance with blocks 330 or 340 respectively has been identified, the last or latest result (be it touch or no-touch) can be returned (block 345).

Figure 4:
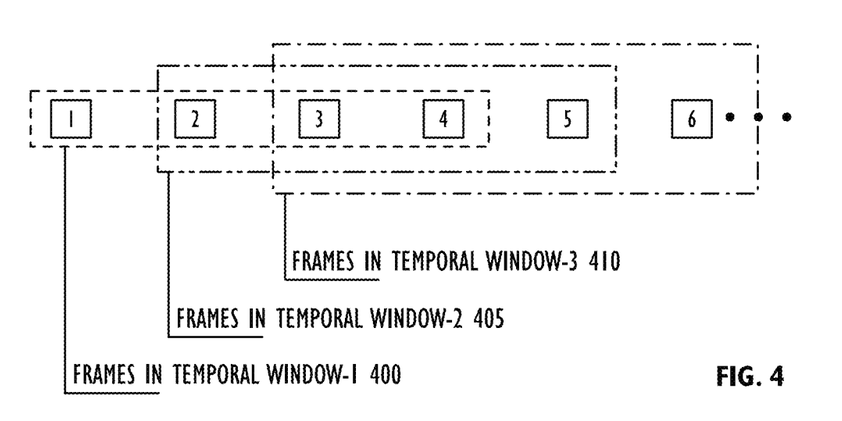
FIG. 4 illustrates a sliding window approach to temporal filtering in accordance with one or more embodiments.

By way of example, in one embodiment a sliding 4-frame temporal window may be used. Referring to FIG. 4, a series of six (6) temporally sequential frames are shown (numbers 1 through 6). Frames 1-4 are shown as being within window-1 400, frames 2-5 are shown as being within window-2 405, and frames 3-6 are shown as being within window-3 410. In this embodiment of a "sliding window" temporal filter, 4 frames are analyzed for a finger/object and classifier output collected before a first determination of touch/no-touch is made. In other embodiments, classifier output may indicate the object (e.g., finger) is approaching, touching or receding from the surface. In yet other embodiments, different classifier output may be weighted differently. By way of example, the most recently obtained classifier output may be given more weight or importance in determining the touch state of the object while the oldest or first classifier output the least weight. In embodiments like this, the combined classifier output may consist of a weighted sum or average of the individually determined classifier outputs with the ultimate output (e.g., touch/no-touch or receding from surface) being subject to a threshold.

Figure 5:
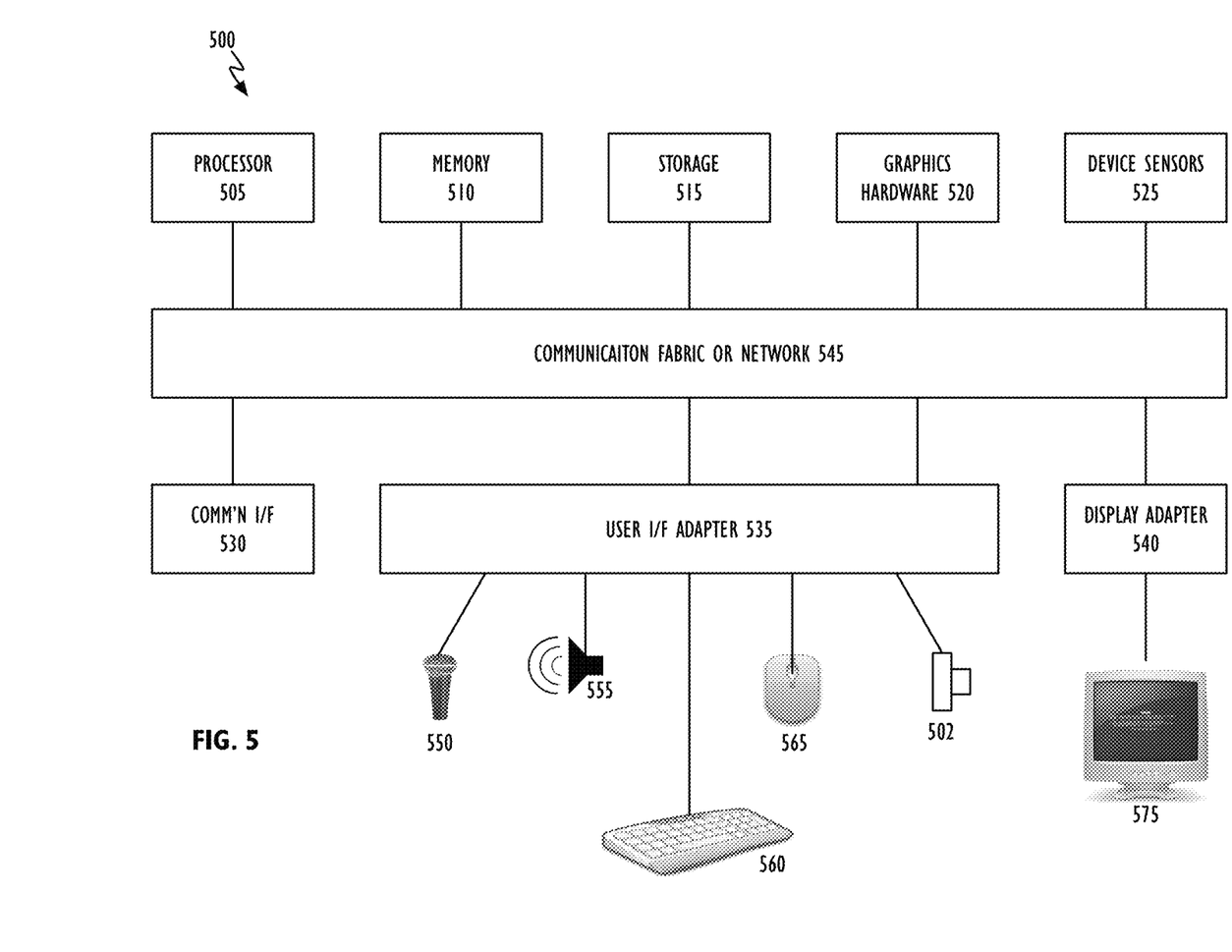
FIG. 5 shows, in block diagram form, a computer system in accordance with one or more embodiments.

Referring to FIG. 5, the disclosed depth-based touch detection operations may be performed by representative computer system 500 having one or more image capture units 502. Computer system 500 could, for example, be a general purpose computer system such as a desktop, laptop, notebook or tablet computer system. Computer system 500 could also be an engineering workstation or a gaming system. Image capture unit 502 could, for example, represent a depth sensor unit. Image capture unit 502 could also represent one or more optical image capture units (aka cameras) including structured light and passive stereo imaging systems.

Computer system 500 can include processor element or module 505, memory 510, one or more storage devices 515, graphics hardware element or module 520, device sensors 525, communication interface module or circuit 530, user interface adapter 535 and display adapter 540—all of which may be coupled via system bus, backplane, fabric or network 545 which may be comprised of one or more switches or one or more continuous (as shown) or discontinuous communication links.

Processor module 505 may include one or more processing units each of which may include at least one central processing unit (CPU) and zero or more graphics processing units (GPUs); each of which in turn may include one or more processing cores. Each processing unit may be based on reduced instruction-set computer (RISC) or complex instruction-set computer (CISC) architectures or any other suitable architecture. Processor module 505 may be a single processor element, a system-on-chip, an encapsulated collection of integrated circuits (ICs), or a collection of ICs affixed to one or more substrates. Memory 510 may include one or more different types of media (typically solid-state) used by processor module 505 and graphics hardware 520. For example, memory 510 may include memory cache, read-only memory (ROM), and/or random access memory (RAM). Storage 515 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 510 and storage 515 may be used to retain media (e.g., audio, image and video files), preference information, device profile information, frameworks, computer program instructions or code organized into one or more modules and written in any desired computer programming language, and any other suitable data. When executed by processor module 505 and/or graphics hardware 520 such computer program code may implement one or more of the methods described herein. Graphics hardware 520 may be special purpose computational hardware for processing graphics and/or assisting processor module 505 perform computational tasks. In one embodiment, graphics hardware 520 may include one or more GPUs, and/or one or more programmable GPUs and each such unit may include one or more processing cores. In another embodiment, graphics hardware 520 may include one or more custom designed graphics engines or pipelines. Such engines or pipelines may be driven, at least in part, through software or firmware. Device sensors 525 may include, but need not be limited to, an optical activity sensor, an optical sensor array, an accelerometer, a sound sensor, a barometric sensor, a proximity sensor, an ambient light sensor, a vibration sensor, a gyroscopic sensor, a compass, a barometer, a magnetometer, a thermistor, an electrostatic sensor, a temperature or heat sensor, a pixel array and a momentum sensor. Communication interface 530 may be used to connect computer system 500 to one or more networks or other devices. Illustrative networks include, but are not limited to, a local network such as a USB network, an organization's local area network, and a wide area network such as the Internet. Communication interface 530 may use any suitable technology (e.g., wired or wireless) and protocol (e.g., Transmission Control Protocol (TCP), Internet Protocol (IP), User Datagram Protocol (UDP), Internet Control Message Protocol (ICMP), Hypertext Transfer Protocol (HTTP), Post Office Protocol (POP), File Transfer Protocol (FTP), and Internet Message Access Protocol (IMAP)). User interface adapter 535 may be used to connect microphone 550, speaker 555, keyboard 560, and one or more pointer devices 565. Display adapter 540 may be used to connect one or more display units 575 which may provide touch input capability.

Figure 6:
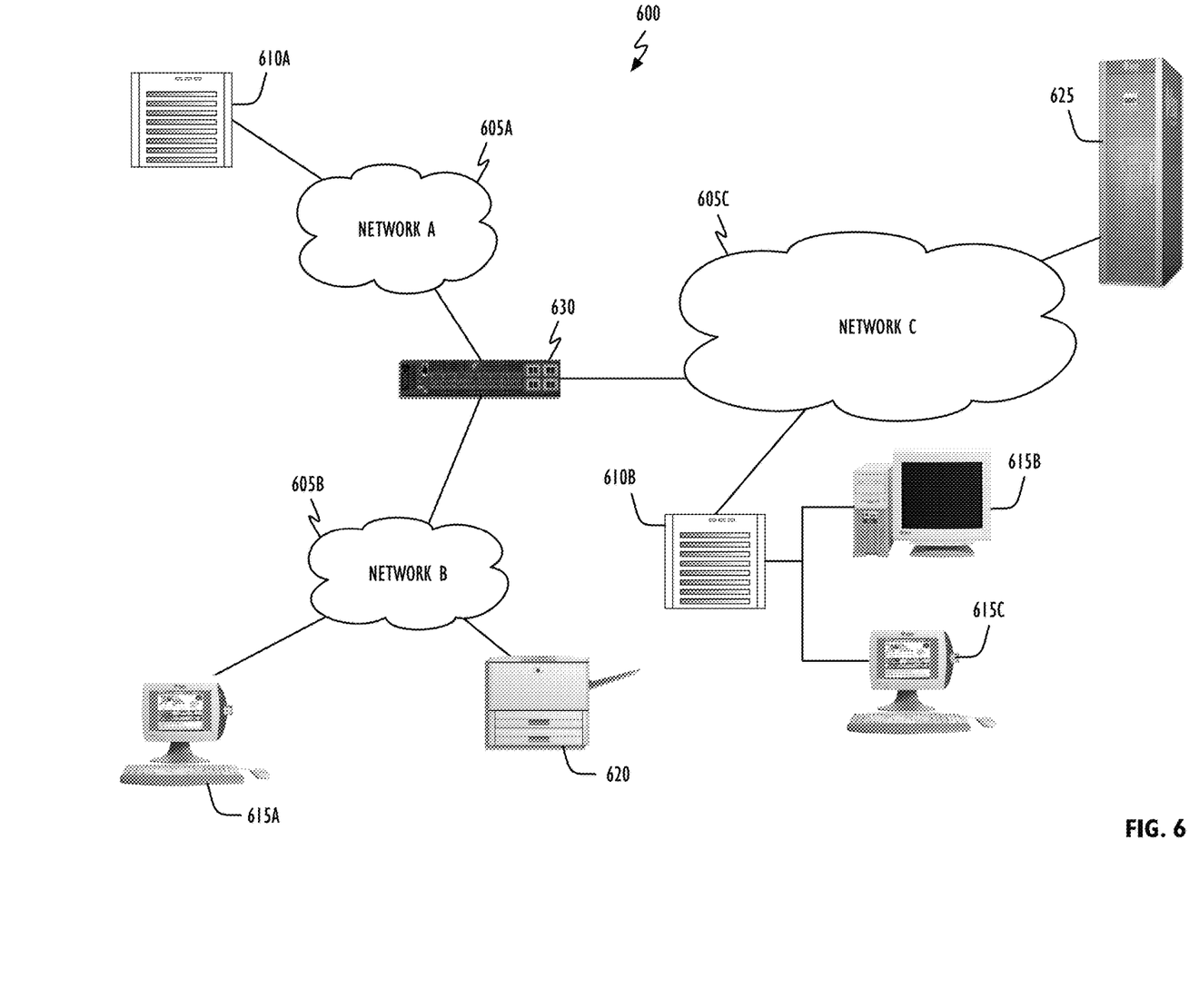
FIG. 6 shows, in block diagram form, a computer network in accordance with one or more embodiments.

Referring to FIG. 6, illustrative network architecture 600 in accordance with one or more embodiments within which one or more computer systems in accordance with FIG. 5 may operate can include a plurality of networks 605, (i.e., 605A, 605B and 605C), each of which may take any form including, but not limited to, a local area network (LAN) or a wide area network (WAN) such as the Internet. Further, networks 605 may use any desired technology (wired, wireless or a combination thereof) and communication protocol (e.g., TCP, or transmission control protocol and PPP, or point to point). Coupled to networks 605 are data server computer systems 610 (i.e., 610A and 610B) that are capable of executing server applications such as database management applications and, further, are configured to communicate over networks 605. Also coupled to networks 605, and/or data server computer systems 610, are client or end-user computer systems 615 (i.e., 615A, 615B and 615C). Each of computer systems 615 may correspond to computer system 500 and be able to execute the disclosed depth-based touch detection operations. In some embodiments, network architecture 600 may also include network printers such as printer 620 and network storage systems such as 625. To facilitate communication between different network devices (e.g., server computer systems 610, client computer systems 615, network printer 620 and storage system 625).

It is to be understood that the above description is intended to be illustrative, and not restrictive. The material has been presented to enable any person skilled in the art to make and use the disclosed subject matter as claimed and is provided in the context of particular embodiments, variations of which will be readily apparent to those skilled in the art (e.g., some of the disclosed embodiments may be used in combination with each other). Accordingly, the specific arrangement of steps or actions shown in FIGS. 1 and 3 or the arrangement of elements shown in FIGS. 2, 5 and 6 should not be construed as limiting the scope of the disclosed subject matter. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A non-transitory program storage device comprising instructions stored thereon to cause one or more processors to:
   obtain a depth map of a scene having a surface, the depth map comprising a plurality of pixel values;
   identify a first region of the depth map, the first region comprising a first plurality of pixel values indicative of an object other than the surface in the scene;
   identify a surface region of the depth map based on the first region, the surface region comprising a second plurality of pixel values indicative of the surface;
   normalize the first region based on the surface region, wherein each normalized pixel value in the normalized first region is indicative of a distance relative to the surface;
   generate an identifier based on the normalized first region;
   apply the identifier to a classifier;
   obtain an output from the classifier based on the applied identifier; and
   perform a first affirmative operation when the classifier output is indicative of a touch between the object and the surface.

2. The non-transitory program storage device of claim 1, wherein the instructions to identify a surface region comprise instructions to cause the one or more processors to:
   identify a plurality of second regions of the depth map, each of the one or more second regions having one or more pixel values, each of the one or more second regions positioned to at least one side of the first region;
   determine, based on each second region's pixel values, one or more statistical measures for each second region; and
   select, based on the statistical measures, one of the plurality of second regions as the surface region.

3. The non-transitory program storage device of claim 2, wherein the instructions to normalize the first region comprise instructions to cause the one or more processors to normalize, based on the pixel values of the selected second region, pixel values of the first region corresponding to the object.

4. The non-transitory program storage device of claim 1, wherein the instructions to identify a surface region further comprise instructions to cause the one or more processors to determine a surface distance value based on a random sample and consensus (RANSAC) operation to pixel values in the first region.

5. The non-transitory program storage device of claim 1, wherein the instructions to identify a first region of the depth map comprise instructions to cause the one or more processors to:
   obtain a color image of the scene, the color image having a plurality of pixels;
   identify a finger patch region based on the color image, the finger patch region comprising a plurality of pixels; and
   identify pixels in the depth map corresponding to at least some of pixels in the finger patch region.

6. The non-transitory program storage device of claim 1, wherein the instructions to normalize the first region further comprise instructions to cause the one or more processors to:
- resize the first region to a specified sized having a specified number of pixel values; and
- normalize the first region based on an orientation of the object.

7. The non-transitory program storage device of claim 1, wherein the classifier comprises a multiclass classifier comprising output indicative of the object approaching the surface, the object touching the surface, and the object receding from the surface.

8. The non-transitory program storage device of claim 1, further comprising instructions to cause the one or more processors to:
- repeat, a plurality of times, the instructions to cause the one or more processors to: obtain a depth map, identify a first region, identify a surface region, normalize, generate, and apply to obtain a temporal sequence of outputs from the classifier;
- determine a combined classifier output based on the temporal sequence of classifier outputs; and
- perform a first affirmative operation when the combined classifier output is indicative of a touch between the object and the surface.

9. The non-transitory program storage device of claim 8, wherein the instructions to cause the one or more processors to determine a combined classifier output comprise instruction to cause the one or more processors to determine an output indicative of the object approaching the surface, touching the surface or receding from the surface.

10. The non-transitory program storage device of claim 1, wherein the instructions to obtain a depth map of a scene comprise instructions to cause the one or more processors to obtain a depth map of the scene from at least one of a stereoscopic camera system, a structured light system, and a time of flight system.

11. A depth-based touch detection method, comprising:
- obtaining a depth map of a scene having a surface, the depth map comprising a plurality of pixel values;
- identifying a first region of the depth map, the first region comprising a first plurality of pixel values indicative of an object other than the surface in the scene;
- identifying a surface region of the depth map based on the first region, the surface region comprising a second plurality of pixel values indicative of the surface;
- normalizing the first region based on the surface region, wherein each normalized pixel value in the normalized first region is indicative of a distance relative to the surface;
- generating an identifier based on the normalized first region;
- applying the identifier to a classifier;
- obtaining an output from the classifier based on the applied identifier; and
- performing a first affirmative operation when the classifier output is indicative of a touch between the object and the surface.

12. The method of claim 11, wherein identifying a surface region comprises:
- identifying a plurality of second regions of the depth map, each of the one or more second regions having one or more pixel values, each of the one or more second regions positioned to at least one side of the first region; and
- selecting, based on the second regions' pixel values, one of the second regions as the surface region.

13. The method of claim 11, wherein normalizing the first region comprises normalizing, based on the pixel values of the selected second region, pixel values of the first region corresponding to the object.

14. The method of claim 11, wherein identifying a first region of the depth map comprises:
- obtaining a color image of the scene, the color image having a plurality of pixels;
- identifying a finger patch region based on the color image, the finger patch region comprising a plurality of pixels; and
- identifying pixels in the depth map corresponding to at least some of pixels in the finger patch region.

15. The method of claim 11, wherein obtaining an output from the classifier comprises obtaining an output from a multiclass classifier indicative of the object approaching the surface, the object touching the surface, or the object receding from the surface.

16. The method of claim 11, further comprising:
- repeating, a plurality of times: obtaining a depth map, identifying a first region, identifying a surface region, normalizing, generating, and applying to obtain a temporal sequence of outputs from the classifier;
- determining a combined classifier output based on the temporal sequence of classifier outputs; and
- performing a first affirmative operation in response to the combined classifier output indicating a touch between the object and the surface.

17. The method of claim 11, wherein obtaining a depth map comprises obtaining a depth map using a stereoscopic camera system, a structured light system, and a time of flight system.

18. An electronic system comprising:
- memory;
- a display unit operatively coupled to the memory;
- a depth map capture system operatively coupled to the memory; and
- one or more processors operatively coupled to the memory, the display unit and the depth map capture system, the one or more processors configured to execute computer instructions stored in the memory to cause the electronic system to—
  - display a scene on the display unit, the scene including a surface;
  - obtain, via the depth map capture system, a depth map of the scene, the depth map comprising a plurality of pixel values stored in the memory,
  - identify a first region of the depth map, the first region comprising a first plurality of pixel values indicative of an object other than the surface in the scene,
  - identify a surface region of the depth map based on the first region, the surface region comprising a second plurality of pixel values indicative of the surface,
  - normalize the first region based on the surface region, wherein each normalized pixel value in the normalized first region is indicative of a distance relative to the surface,
  - generate an identifier based on the normalized first region,
  - apply the identifier to a classifier,
  - obtain an output from the classifier based on the applied identifier, and
  - perform a first affirmative operation when the classifier output is indicative of a touch between the object and the surface.

19. The electronic system of claim 18, wherein the instructions to identify a surface region comprise instructions to cause the one or more processors to:
- identify a plurality of second regions of the depth map, each of the one or more second regions having one or more pixel values, each of the one or more second regions positioned to at least one side of the first region;
- determine, based on each second region's pixel values, one or more statistical measures for each second region; and
- select, based on the statistical measures, one of the second regions as the surface region.

20. The non-transitory program storage device of claim 2, wherein, for each of the plurality of second regions, the statistical measures include a measure of variance in depth values of pixels in the second region, and wherein the instructions to select, based on the statistical measures, one of the plurality of second regions as the surface region comprise instructions to cause the one or more processors to select the one second region in response to the one second region having a lowest measure of variance amongst the plurality of second regions.

* * * * *